INVENTOR.
Douglas W. Quirk
BY Andrew G. Hubbard
Atty.

United States Patent Office 3,131,756
Patented May 5, 1964

3,131,756
COMBINED OVEN AND ROOM
AIR CONDITIONER
Douglas W. Quirk, Deerfield, Ill., assignor to General
Electric Company, a corporation of New York
Filed Oct. 18, 1960, Ser. No. 63,429
5 Claims. (Cl. 165—12)

This invention relates to combination kitchen appliances and more particularly to combinations which include an oven for cooking foods and a room air conditioner functionally inter-related with the oven.

The present invention is particularly applicable to ovens of the type in which food is placed for cooking operations which are to start at some predetermined later time. The usual use of such an oven occurs where the prospective evening meal is set in the oven cavity several hours before the cooking operation begins. The oven controls and timer are pre-set at that time so that the cooking operations may commence at a predetermined time in the afternoon. In this way the evening meal may be completely cooked while the meal preparer is absent from the location of the oven.

Frequently, the food is placed in the oven before the start of the working day and must remain in the warm, generally humid oven for at least five to eight hours before the cooking is to begin. This five- to eight-hour period in hot, summer weather is sufficient to allow the growth of bacteria in sufficient quantities to cause partial decomposition of the food involved. This condition is especially prevalent and dangerous where chopped meats or other foods having many air contact surfaces are being prepared.

To alleviate these difficulties, the present invention provides in the range structure a room air conditioner. The air conditioner generally is used to perform its usual function of cooling the ambient atmosphere in the room in the usual manner. In addition, suitable controls are provided so that when the oven controls are set to start cooking at some timed period, herein called Time Bake, the air conditioner is energized and at least a portion of its output is diverted into the oven cavity to thereby keep the oven cavity at a safe cool temperature. Naturally, the lower the temperature the greater the inhibition of growth of bacteria. Preferably, the optimum food storage temperature would be about 50° F. or less, and this condition is readily attained by the present invention.

Therefore it is the principal object of the invention to utilize the output of an air conditioner to refrigerate the contents of an oven which is pre-set to await the start of cooking operation at a specific future time.

It is a further object of the invention to provide an air conditioner having a normal output path and a second output path controlled by the action of a kitchen range control.

It is a still further object of the invention to utilize the time bake control mechanism of a cooking appliance to govern the action of a room air conditioning unit allied therewith.

Other objects, features and advantages of the invention will be apparent from the detailed description of the presently preferred embodiment thereof, read in conjunction with the accompanying drawings in which.

Figure 1:
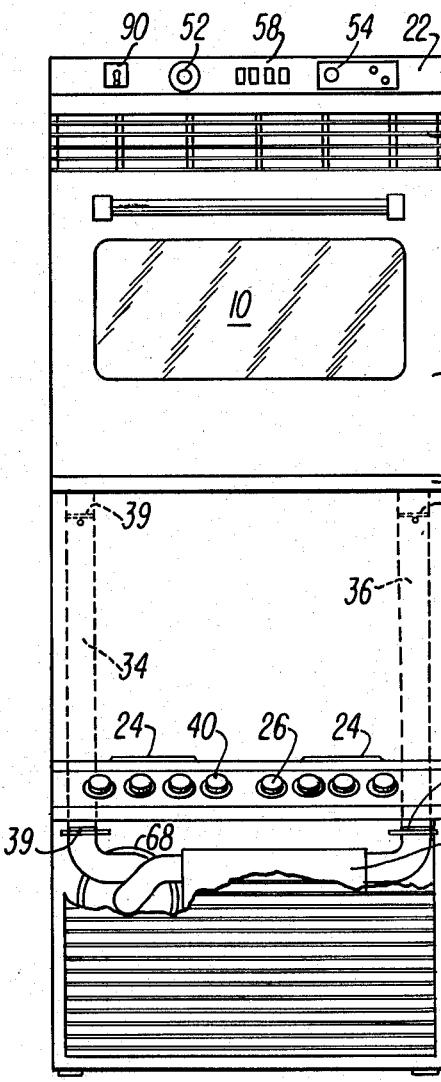
FIG. 1 is a partially sectioned front elevational view of a combined appliance embodying the invention.
Figure 2:
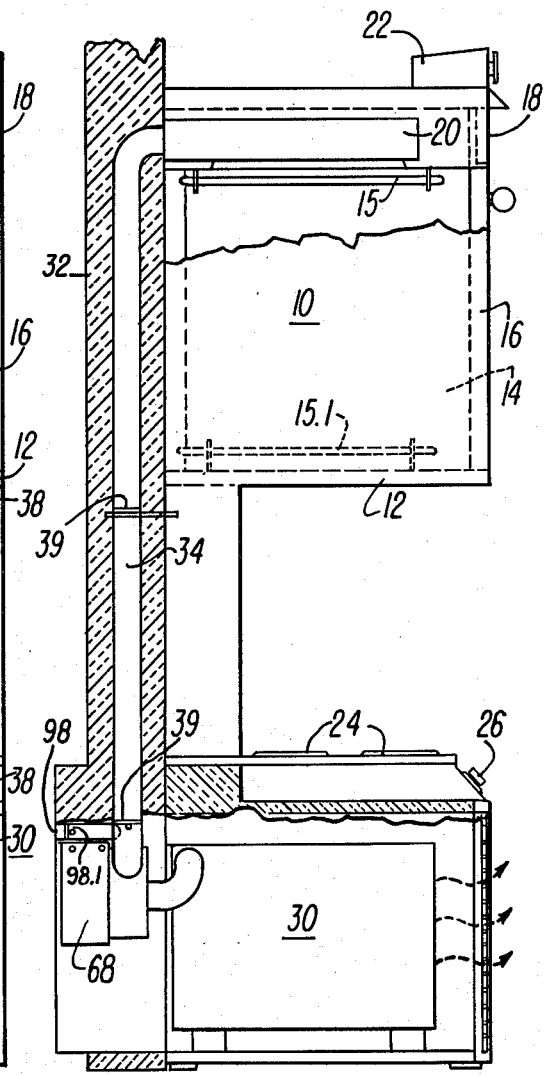
FIG. 2 is a partially sectioned side elevational view of the kitchen combination.

Referring now to FIGS. 1 and 2, a preferred physical embodiment of the kitchen combination may be seen. The combination includes at eye level or thereabouts an oven 10 which comprises a rectangular configuration of insulated walls 12 surrounding an oven cavity 14. Within the cavity there are aligned horizontally a first and a second heating unit 15 and 15.1. At the front of the oven cavity there is a bottom hinged door 16 movable from the closed position shown to an open position in which the door is horizontally extended from the oven cavity in a known fashion. The door by generally known expedients (not shown) may also be held in a slightly ajar position suitable for broiling. Above the door in the front wall of the oven is a decorative grill 18 behind which there may be provided in a readily removable manner an oven filtering apparatus 20 comprising layers of activated charcoal and the like. Also arranged along the front oven wall in the area above the grill is a control section 22 including a plurality of externally manipulatable control knobs and buttons governing the action of mechanisms positioned with the control section. The functioning of these controls will be explained more fully later.

Spaced below the oven is a surface cooking top of the generally known type, including in this instance, four surface heating units. Each of the units has a control mechanism individual to it and manipulated by a rotatable knob 26 extending in a plane angled to the cooking top.

Beneath the cooking top is a room air conditioner 30. This air conditioner is shown protruding through a suitable opening in external wall 32 to supply necessary cooling air for the condenser. Optionally, a water cooled, or air blast cooled, air conditioner could be employed with no significant changes in the principle of operation of the invention. Such air conditioners are well known in the art. The air conditioner shown may be of any of the conventionally known types with a few changes in construction. One of these changes includes the means of communication between the air conditioner and the oven cavity in the form of identical ducts 34 and 36 on each side of the structure. Duct 34 is used as an intake duct from the air conditioner to the oven cavity and the other duct 36 is used to exhaust air from the oven back to the conditioner. Both ducts extend from the air conditioner vertically within wall 32 to terminate in filter 20 above the oven cavity. Within both ducts 34 and 36, there are provided an upper and a lower damper mechanism (indicated as 30 in duct 36, and 39 in duct 34) which jointly tend to shut off the flow of air within the duct. These dampers may be individually solenoid operated and the dampers within each duct are connected for simultaneous operation. In the open positions of the damper there is open communication between the air conditioner air flow system and the oven cavity through the air filter 20. When the dampers are closed, the line of communication between the oven and the air conditioner is effectively barred and a dead air space between the two appliances is formed tending to thermally insulate these appliances from one another. In a third expedient dampers 38 in exhaust duct 36 may be retained in the open position with dampers 39 of the inlet duct closed to allow the oven cavity to be exhausted of hot air.

Further in FIG. 1, there can be seen a series of control knobs 40 which will operate the air conditioner in its normal manner.

Figure 3:
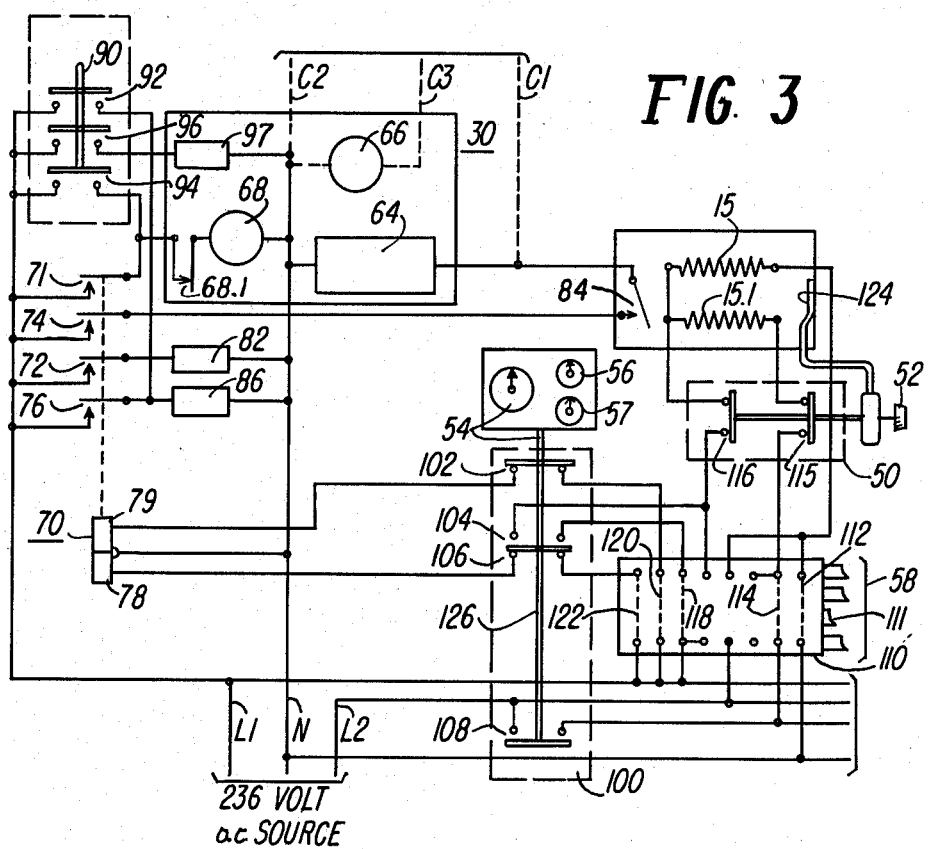
FIG. 3 is a schematic circuit diagram to perform the functions of the combination.
Figure 4:
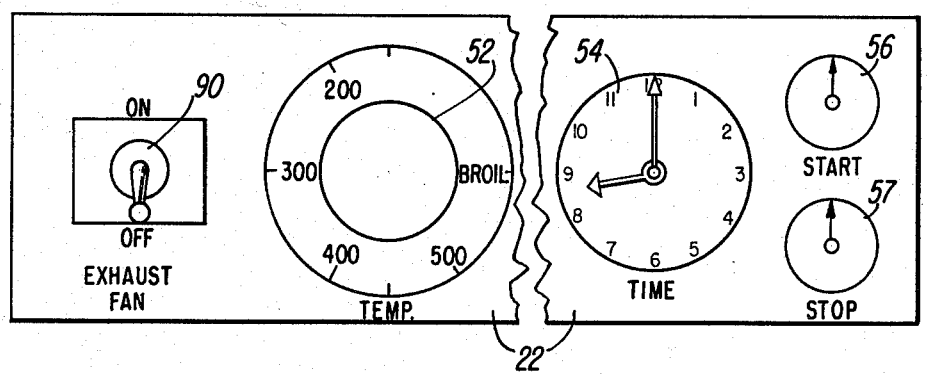
FIG. 4 is a detailed front elevational view of the top control panel of FIGS. 1 and 2.

In the circuit of FIG. 3 can be seen a simplified control system for the interaction of the air conditioner and the oven. Included is the oven thermostat control 50 with its external knob 52 located physically on control panel 22. Also mounted in the control panel is the timer control mechanism 54 with its external dial face and allied therewith knobs 56 and 57. Knob 56 is used to pre-set the time for the start of cooking operations and knob 57 for pre-setting a stoppage of cooking operations. Aligned horizontally on the panel are the buttons array 58 (FIG. 3) for selecting the operations to be conducted. These buttons are normally inter-locked so that only one button can be depressed to properly select the desired circuit closures within the selection mechanism 110. These mechanisms and the circuitry involved are of generally the same type as that shown in U.S. Patent 2,778,914, issued on January 22, 1957 to B. J. Vallorani. Further there is included an on-off switch 90 for controlling the exhausting of air from the oven. This last mentioned condition will be utilized mostly during broiling operations with the door of the oven in the slightly ajar position. The circuit also includes the electrical components of the air conditioning apparatus 30 which includes a compressor 64, a normal air circulating fan 66, and an auxiliary air circulating fan 68. The compressor 64 and the normal fan 66 are of any generally known type used in room air conditioners, said fan 66 performing the usual function of discharging cooled air from the air conditioner 30, as indicated by the arrows in FIG. 2. Fan 68 is of lesser capacity than the normal fan and is positioned adjacent the opening to intake duct 34 to circulate air therethrough. Further there is provided a two-step relay 70 with its normally open contacts 71, 72, 74 and 76. This relay is of the type which includes two windings, a first winding 78 which when energized operates the relay, and a second winding 79 which when energized maintains the relay operated. Relay 70 includes a number of normally open contact sets which, of course, close individual circuits on operation of the relay. Contacts 71 on closure complete an obvious circuit path to the air conditioner auxiliary blower motor 68. Contact set 72 on closure closes an obvious circuit for energizing intake damper solenoid 82 over a path from lead L1 to lead N. This damper solenoid when energized through a mechanical linkage (not shown) cocks both the upper and lower dampers 39 in the intake duct to an open position. These dampers are biased by means of suitable biasing springs (not shown) to return to their closed position on release of solenoid 82.

Contacts 74 are used to close the temperature control to the compressor. Thus, a path can be traced from lead L1 through contacts 74, and temperature sensor 84 to compressor 64 and lead N. Temperature sensor 84 may be of the generally known bi-metal high-low type which for our purposes should be set to open at temperatures below 50° F. Physically the thermostat should be installed in a sidewall of the oven to sense and react to oven cavity temperature. The setting of the thermostat is such that with oven cavity temperatures above 50° F., an energizing circuit is prepared to compressor 64. This circuit to compressor 64 also, as previously mentioned, includes contacts 74 which are closed only during the pre-cooking timed bake period, hence, the compressor is not energized by the elevated temperatures encountered in normal cooking operations. During this pre-cooking time period, the thermostat operatively associates the compressor with the temperature of the oven cavity. When the oven cavity temperature is above 50° F., thermostat 84 closes its contacts completing the circuit path to the compressor. The compressor operates and as a result the air fed to the oven cavity is cooled. When as a result of this cooling effect, the oven temperature drops below 50° F., the contacts of the thermostat open shutting off the compressor. The temperature then rises until thermostat 84 reacts again closing the circuit to the compressor. This cycling of the compressor tends to keep the oven cavity temperature reasonably close to 50° F. which preserves the food from excess bacteria growth while not depressing the temperature of the cavity sufficiently to freeze the food. With these somewhat broad limitations, it is evident that the thermostat used need not be of undue sensitivity or speed of response.

Contact set 76 closes an obvious circuit to energize exhaust damper solenoid 86 over a path from lead L1 to lead N. A parallel circuit for operating this solenoid may be traced from lead L1 through suitable contacts of switch 90. Switch 90 is a manually actuatable, triple pole, single throw switch which may be located on the control section panel with indicia reading "Exhaust Fan." The switch is used during broiling operations when the door of the oven is maintained in a slightly ajar position and it is desired that broiling odors emitted be exhausted externally of the building. This switch when actuated during a cooking operation utilizes the exhaust duct of the oven cooling network and the auxiliary blower of the air conditioner for exhausting air from the oven cavity through filter 20. Switch 90 includes three normally open sets of contacts 92, 94 and 96 respectively. Contacts 92 serve as the secondary path for operation of the exhaust damper solenoid 86. Contacts 94 serve as a parallel path for the operation of auxiliary blower 68 of the air conditioner. Contacts 96 serve to operate a vent controlling solenoid 97. When this solenoid is energized, the vent 98 from the exhaust system within the air conditioner is opened by opening vent damper 98.1 allowing the exhaust air to be evacuated from the building. As is generally known, air conditioning utilizes a closed air cycle while cooling or exhausting requires open venting to the building exterior. Vent 98 would nominally serve this function and its damper 98.1 would be operable, although not shown as such, from the air conditioner controls in the normal manner.

The nominal oven controls used in this embodiment include a timer and allied therewith start and stop controls. This timer has a clock face 54, a manipulatable handle 56 for pre-setting and a control allied with a timing operation. This timing may be set for normal timing of a cooking operation or for pre-setting of an operation to start at some predetermined future time. In either instance, the timer switch mechanism 100 does not function until the actual start of the cooking operation as indicated by the setting of the start timer and the action of the clock timer in reaching that pre-set time. The timer mechanism includes a normally operating electric motor and interlinked therewith a handle which can be set to any clock time for starting of an operation. Also interlinked functionally with the clock timer is a knob and mechanism 57 which comprise a setting for shutting off the oven at a predetermined time. The timer mechanism also includes a plurality of contacts 102, 104 and 108 respectively. Contacts 102 are normally closed to complete a circuit from oven control switch bank 110 to hold winding 79 of cooling control relay 70. Contacts 104 are normally open and close to complete a circuit to the oven heating element 15. Contacts 106 are normally closed to complete a path from the switch bank to start winding 78 of relay 70 and contacts 108 are normally open and close to energize heat coil 15.1.

Switch bank 110 includes a number of switch contacts which are individually responsive to depression of one of the buttons in array 58 to close a plurality of circuit paths. Details of the operation of this switch bank may be found in the previously cited Vallorani patent. Only those circuit closures pertinent to the timed bake function have been illustrated. These closures are indicated by the dotted lines within the switch bank and these are so marked to indicate the circuits closed on depression of timed bake button 111. The circuits so closed include a circuit 112 closing the path to heating element 15. A second closed circuit 114 closes a path through thermostatically controlled contacts 115 to heating unit 15.1 over a path including thermostatically controlled contacts 116 and closed circuit 118 in the switch bank for completion of a circuit to a source of 236 volts, single phase alternating current at leads L1 and L2 through contacts 104 and 108 of timer switch 100. Completed circuit 120 serves to complete a circuit on closure to the hold winding 79 through timer contacts 102. Circuit 122 is of a type which is closed only momentarily and only on depression of the timed bake button 111. This circuit on closure completes a circuit from L1 through contacts 106 (with the timer handle operated) through initial energizing winding 78 and neutral lead N to provide the energizing winding with a momentary surge of 118 volt A.C. current. From this circuitry, it can be seen that relay 70 can only be energized by the depression of the timed bake button and the consequent energization of winding 78. Once energized, the relay remains operated by energization of hold winding 79 until timer mechanism 100 functions to start a cooking operation. The relay will then release and can not re-start until another depression of the timed bake button.

The circuit also includes the normal oven thermostatic control 50 with an external knob 52 controlling the functioning levels of the mechanism. Included are contact sets 115 and 116 which are normally closed and which open when temperature sensor 124 indicates that the oven cavity temperature is above the level set for the specific cooking operation in process. The functioning of temperature control 50 is generally known and is dependent primarily on sensor 124 being positioned to sense the ambient temperature of the oven cavity most feasibly.

The operation of the invention as it pertains to the timed baking operation is as follows: The food to be cooked is placed in the oven cavity and the timer handle 56 is rotated to a position indicating the start of the cooking operation at the predetermined time. Thus, if for example the setting takes place at 8:00 a.m., a cooking start of 3:00 p.m. is set by knob 56 and a completion of cooking is set for 6:00 p.m. by knob 57. This pre-setting prepares the mechanism so that at 3:00 p.m. the timer will function and operate switch mechanism 100 and the mechanism will release at 6:00 p.m. The temperature at which the operation is to take place is set at knob 52 and the timed bake button 111 is depressed. At this time, no effect is felt within the oven, etc. since timer switch 100 will not function until 3:00 p.m.

Depression of the timed bake button 111 closes circuits 112, 114, 118 and 120 for the duration of the depression of the button. Contacts 122 close momentarily completing an energizing circuit from lead L1 through circuit 122, closed contacts 106, winding 78 of relay 70 to lead N. This places the energizing winding across the 118 volt source sufficiently long to energize the relay after which the relay is held operated over winding 79. This hold path may be tracted from lead L1 through circuit 120, closed contacts 102, hold winding 79 to lead N. The remaining closed circuits in the push button switch bank complete no circuits at this time since the timer mechanism 54 has not actuated its contact shaft 126.

Energization of the relay 70 completes a plurality of circuits to the air conditioner 30. Contacts 71 close a path from lead L1 to blower 68 causing the blower to operate. At contacts 72, a circuit is closed from lead L1 to solenoid 82 and lead N. Solenoid 82 is thereby energized opening the dampers in the intake duct 34 and holding these dampers open. At contacts 74, a circuit is closed from L1, through thermostat contacts 84 which are closed, compressor 64 to lead N. It should be noted that the temperature of the oven cavity would nominally be above 50° F. in most homes and as a result contacts of thermostat 84 would be closed. At contacts 76, a circuit is closed to solenoid 86 and lead N. This circuit energizes the solenoid which in turn opens the dampers in exhaust duct 36.

At this time, since the compressor 64 and blower 68 of the air conditioner are operated and the dampers are open, a circulatory path for cool air is completed. This path physically may be traced from blower 68, past open dampers 39 through duct 34 and through filter 20 into oven cavity 14. The return path of exhaust air from the oven cavity may be traced through filter 20 and past open dampers 38 in exhaust duct 36 and into the air conditioner system. When the oven cavity temperature drops below 50° F., contacts 84 open thus shutting off the compressor. Air flow continues since the remainder of the system is retained operative. The compressor cycles to continually cool the oven utilizing the normal air conditioning internal apparatus until 3:00 p.m., the time set exemplarily for start of the cooking operations occurs.

When the pre-set time is reached by the timer mechanism, as indicated by the timer 54 reaching the time set by knob 56, shaft 126 is drawn upwardly opening contacts 102 and 106 and closing contacts 104 and 108. Opening of contacts 106 serves no function since this circuit has been opened after mementary closure only at circuit 122. Opening of contacts 102 serves to open the hold path to relay 70 which then restores releasing its contacts 71, 72, 74 and 76. Opening of these contacts opens the circuits to blower 68, solenoid 82, compressor 64 and solenoid 86 respectively. This action disconnects the oven air conditioner from the cooling circuit by deenergizing blower 68, and closes dampers 38 and 39. Air conditioner 30 may operate over its normal operating circuit if operated over leads shown dotted and designated C1, C2 and C3. These leads signify the connection of the air conditioner to its normal operating controls, the specific mode of operation of which is outside the scope of this invention. On closure of contacts 108, a circuit is closed from lead L2, through closed contacts 108, circuit 114, closed contacts 115, heating element 15.1, closed contacts 116, contacts 104, circuit 118 and lead L1. Element 15.1, the baking heater will be energized over this 236 volt path and will begin to heat.

A further circuit is closed from lead N through closed circuit 112, heating element 15, contacts 116, contacts 104, circuit 118 and lead L1. Element 15, the broiling unit, is thereby energized over the 118 volt circuit to provide low wattage heat at the top of the oven, as usual in electric oven baking operations. After this start of cooking operations, heaters 15 and 15.1 are cycled under the control of thermostat contacts 115 and 116 as set and the cooking operation progresses normally. It should be noted that all dampers 38 and 39 are closed forming air spaces in the ducts thus efficiently insulating the air conditioner oven cooling system from the oven heat.

At the termination of the timed cooking operation as pre-set on knob 57, shaft 126 of the timer restores to the position of FIG. 3 opening contacts 104 and 108 and reclosing contacts 102 and 106. Contacts 104 and 108 open the previously described heating element circuits on restoration. Contacts 102 reclose the path to hold winding 79 but relay 70 does not operate since momentary circuit 122 remains open in the path to through contacts 106 in the circuit to starting winding 78.

The use of the air conditioner as an exhaust during broiling operations follows actuation of switch 90 to its operated position. This actuation closes contacts 92 completing a circuit to solenoid 86, closes contacts 94 completing a circuit to blower 68, and closes contacts 96 and completes a circuit to venting solenoid 97. Energization of solenoid 97 actuates damper 98.1 which opens vent 98. As a result, solenoid 86 opens the exhaust dampers 38, blower 68 is energized and a vent in the oven cooling path is opened. Thus air is drawn from the oven cavity by the exhaust fan through filter 20, exhaust duct 38 and out the open vent 98 to be exhausted outside the building, evacuating all odors and fumes from the oven. Fresh air is drawn into the oven cavity past the partially open door essential to successful broiling. On shutting off of switch 90, the system returns to normal.

Another condition which might arise is that in which the air conditioner is operating in its normal fashion and thereafter it is intended that the "Timed Bake" feature of the oven be utilized also. In this instance then, the air conditioner compressor 64 and normal fan 66 are operated over leads C1, C2 and C3 leading to the air conditioner controls (not shown). Then actuation of the timed bake start switch would energize relay 70 to complete the circuits previously described for operation of oven cooling. First a parallel path to compressor 64 which is already in operation is completed. Secondly, a circuit to auxiliary blower 68 and damper solenoids 82 and 86 would also be completed to open the duct work from the air conditioner for the recirculating system to the oven cavity for cooling. Alternatively, a switch 68.1 could be employed which would in any known manner be opened by actuation of air conditioner controls. By use of this switch, auxiliary blower 68 would be employed only when the normal air conditioner blower 66 was inoperative. By the use of this alternative method during simultaneous room air conditioning and oven cooling, only blower 66 would be used to cool both the room and the oven cavity.

While there has been described what is at present thought to be the preferred embodiment of the invention, it will be understood that various modifications may be made therein and it is intended to cover in the appended claims all such modifications as fall within the true spirit and scope of the invention.

What is claimed is:

1. In a kitchen combination comprising an oven including an oven cavity and controls therefor and a room air conditioner, said air conditioner being normally operative for cooling the surrounding room; the invention comprising oven control means for pre-setting operations to occur in said oven at a predetermined future starting and completion time, switch means operated in response to the presetting of said controls for establishing an electrical circuit energizing said room air conditioner, air circulating means including a blower energized concurrently with said air conditioner in response to said operation of said switch means for withdrawing cool air from said air conditioner; a conduit communicating between the discharge of said air circulating means and said oven cavity, valve means in said conduit means arranged normally to block communication between said circulating means and said oven cavity, an electromotor mechanism in said air conditioner energizing circuit and responsive to the operation of said switch means for opening said valve means to open communication through said conduit means thereby allowing cooling air flow from said air conditioner to said oven cavity, and thermostat means in said cavity for cycling said air conditioner energy circuit to maintain said cavity at a predetermined cool temperature consequent to said presetting.

2. In combination: an air conditioner having means for cooling air; a cooking oven having heating means for effecting cooking operations therein; a first air circulation system for causing air flow in heat exchange relation with said cooling means and the discharge of cooled air into a room; a second air circulation system including air ducts communicating between said air cooling means and said oven; a blower in said second air circulation system for enforcing a flow of cooling air through said oven; first and second and third electric circuits for respectively energizing said air conditioner, said blower, and said oven heating means; time-control means for pre-setting a cooking operation to be performed in said oven at a predetermined future time; normally open switch means in each of said first and second circuits; means for effecting closure of said first and second circuit switch means; and switch means in said time-control means for energizing said third circuit at said predetermined future time while concurrently effecting the opening of said first and second circuit switch means.

3. The combination according to claim 2, further including a normally closed damper in said second air circulation system, electromotor means for opening said damper, an energy circuit including switch means for energizing said electromotor means, and means for operating said switch means between open and closed circuit condition concurrently with the opening and closing of the switch means in said second-named circuit.

4. The combination according to claim 2, further including a thermostat in said first-named circuit, said thermostat being responsive to the temperature of air within said oven and arranged to open said circuit when said oven air temperature is below a predetermined minimum.

5. The combination comprising an air conditioner having means for cooling air; a cooking oven having heating means for effecting cooking operations therein; a first air circulation system for causing air flow in heat exchange relation with said air cooling means and the discharge of cool air into a room; a second air circulation system including air ducts communicating between said air cooling means and said oven; a blower in said second air circulation system; normally closed damper means in said air ducts; electromotor means for opening said damper means; electric circuits respectively individual to said air conditioner, said blower, said oven heating means and said electromotor means for energizing the same; a time-controlled means arranged to be preset to begin a cooking operation at a predetermined future time, said time-control means having switch means closed by said presetting operation to prepare a circuit for energizing said air conditioner, said blower, and said electromotor circuits; manually operable switch means in said prepared circuit to complete the same; and switch means in said time-controlled means to complete the energy circuit to said oven heating means; the respective switch means of said time-controlled means being in a ganged relation whereby the energization of said oven heating means opens said first-named time-control switch means to interrupt the previously energized air conditioner, blower, and electromotor means circuits to prevent flow of cool air to said oven during the cooking operation.

References Cited in the file of this patent

UNITED STATES PATENTS

| | | |
|---|---|---|
| 2,326,733 | Hull | Dec. 14, 1943 |
| 2,464,213 | Cataldo | Mar. 15, 1949 |
| 2,504,794 | Berman et al. | Apr. 18, 1950 |